US009658325B2

(12) United States Patent
Harvey et al.

(10) Patent No.: US 9,658,325 B2
(45) Date of Patent: May 23, 2017

(54) SECONDARY SURVEILLANCE RADAR SIGNALS AS PRIMARY SURVEILLANCE RADAR

(71) Applicant: James Francis Harvey, Almonte (CA)

(72) Inventors: James Francis Harvey, Almonte (CA); James Stuart Wight, Ottawa (CA)

(73) Assignee: James Francis Harvey, Ottawa, Ontario (CA)

( * ) Notice: Subject to any disclaimer, the term of this patent is extended or adjusted under 35 U.S.C. 154(b) by 312 days.

(21) Appl. No.: 14/448,355

(22) Filed: Jul. 31, 2014

(65) Prior Publication Data

US 2016/0033630 A1    Feb. 4, 2016

(51) Int. Cl.
*G01S 13/06* (2006.01)
*G01S 13/78* (2006.01)
*G01S 13/26* (2006.01)

(52) U.S. Cl.
CPC ............ *G01S 13/781* (2013.01); *G01S 13/26* (2013.01)

(58) Field of Classification Search
CPC ................................. G01S 13/26; G01S 13/781
USPC .......................................................... 342/43
See application file for complete search history.

(56) References Cited

U.S. PATENT DOCUMENTS

| 4,983,979 A * | 1/1991 | McKenzie | G01S 13/30 342/131 |
| 2005/0128131 A1* | 6/2005 | Rosenberg | G01S 13/78 342/45 |
| 2008/0106466 A1* | 5/2008 | Kelley | G01S 7/2813 342/371 |
| 2009/0142053 A1* | 6/2009 | Varshneya | G01S 7/481 398/33 |

(Continued)

FOREIGN PATENT DOCUMENTS

WO    2010074618 A1    7/2010

OTHER PUBLICATIONS

T.G. Leighton et al., Radar clutter suppression and target discrimination using twin inverted pulses; Proceedings of the Royal Society A; Mathematical; Physical and Engineering Science; Oct. 23, 2013.

(Continued)

*Primary Examiner* — Timothy A Brainard
(74) *Attorney, Agent, or Firm* — Brion Raffoul

(57) ABSTRACT

Systems and methods relating to the use of one type of radar technology to accomplish the function of another type of radar technology. Secondary Surveillance Radar/Identification Friend or Foe (SSR/IFF) technology can be used as if it was Primary Surveillance Radar (PSR) to gain the advantages of both systems. Radar signals useful for SSR/IFF are used as PSR signals. Reflections of the SSR/IFF signal off of both airborne and ground based aircraft, and ground based vehicles and items are used to locate and identify these aircraft, vehicles and items. For SSR/IFF transponder (Continued)

equipped aircraft, the reflected SSR/IFF signals provide (prove dial) dual confirmation of the aircraft's presence while for non-transponder equipped aircraft, the reflected signals provide an indication of the aircraft's presence. The use of SSR/IFF signals reflected off of ground based vehicles and items provides an indication of ground based vehicles and items present around the installation receiving the reflected SSR/IFF signals.

23 Claims, 20 Drawing Sheets

(56) References Cited

U.S. PATENT DOCUMENTS

| | | | | |
|---|---|---|---|---|
| 2010/0214152 | A1* | 8/2010 | Huang | G01S 7/025 342/29 |
| 2010/0286514 | A1* | 11/2010 | Leighton | G01S 7/292 600/437 |
| 2013/0141270 | A1* | 6/2013 | Rodenbeck | G01S 13/0209 342/137 |
| 2013/0176163 | A1* | 7/2013 | Margolin | G01S 5/12 342/118 |
| 2013/0194130 | A1* | 8/2013 | Abatzoglou | G01S 13/5244 342/159 |
| 2014/0153632 | A1* | 6/2014 | Malaga | H04L 7/042 375/239 |

OTHER PUBLICATIONS

Allen et al., Extending Subnoise-level Signal recovery in Radar Applications; Polar Radar for Ice Sheet Measurement (PRISM) Project; ADC 2005.

Simpson et al., Pulse Inversion Doppler: A new method for Detecting Nonlinear Echoes from Microbubble Contrast agents; IEEE Transactions on Ultrasonics, Ferroelectrics, and Frequency Control, vol. 46, No. 2, Mar. 1999.

Merrill I. Skolnik, Introduction to Radar systems; third edition; 2001.

Bezousek, Pavel et al., Dual Frequency Band Integrated Antenna Array, 2013 7th European Conference on Antennas and Propagation (EuCAP).

* cited by examiner

SECONDARY SURVEILLANCE RADAR SIGNALS AS PRIMARY SURVEILLANCE RADAR

TECHNICAL FIELD

The present invention relates to radar technology. More specifically, the present invention relates to using secondary surveillance radar technology for primary surveillance radar purposes.

BACKGROUND OF THE INVENTION

The use of radar for detecting aircraft dates back to the pre-World War II era. Developments in radar technology have led to different types and uses for radar. For Air Traffic Control (ATC) and Air Defense Control (ADC), there are two main types used: Primary (sometimes called Area) Surveillance Radar (PSR) and Secondary Surveillance Radar (SSR)/Identification Friend or Foe (IFF). PSR uses reflection from the "skin" of "targets" to detect their presence (see FIG. 1). It can be 2 dimensional (range and azimuth) or 3 dimensional (range, azimuth and altitude). SSR/IFF, on the other hand, uses an interrogation pulse sequence at one frequency to trigger a transponder on the target to respond with a related pulse sequence at a different frequency (see FIG. 2). SSR/IFF responses typically contain information (e.g. identification, altitude) regarding the interrogated aircraft.

Each of these types of radar has its own problems. PSR does not provide radar operators with information about the interrogated aircraft while SR/IFF only works with aircraft having a transponder. Currently, airports and other Air Traffic Control facilities have to be equipped with both these systems to take advantage of their respective benefits. As well, neither system can reasonably be used to detect ground-based artefacts such the baggage carts, vehicles, parked aircraft, or aircraft waiting to take off. In addition, both types of radar are required for an Air Traffic Controller to "see" both transponder-equipped and non-transponder-equipped aircraft that mix in airspace surrounding the airport/airfield (e.g. arriving and departing aircraft).

Based on the above, there is therefore a need for systems and methods which mitigate if not overcome the above noted deficiencies of the prior art.

SUMMARY OF INVENTION

The present invention provides systems and methods relating to the use of one type of radar technology to accomplish the function of another type of radar technology. Secondary Surveillance Radar/Identification Friend or Foe (SSR/IFF) technology can be used as if it was Primary Surveillance Radar (PSR) to gain the advantages of both systems. Radar signals useful for SSR/IFF are used as PSR signals. Reflections of the SSR/IFF signal off of both airborne aircraft and ground based aircraft, vehicles and other items are used to locate and identify these aircraft, vehicles and items. For SSR/IFF transponder equipped aircraft, the reflected SSR/IFF signals plus the SSR/IFF response provide dual confirmation of the aircraft's presence while for non-transponder equipped aircraft, the reflected signals provide an indication of the aircraft's presence. The use of SSR/IFF signals reflected off of ground based items provides an indication of ground based items present around the installation receiving the reflected SSR/IFF signals.

In a first aspect, the present invention provides a method for detecting a presence of a remote item from an installation remote from said item, the method comprising:
 a) transmitting an interrogation signal from said installation, said interrogation signal being a signal useful for activating a transponder on a transponder equipped aircraft;
 b) receiving a reflected signal from said remote item, said reflected signal being a signal reflection of said interrogation signal reflected off of said remote item;
 c) determining a distance and bearing of said remote item using said reflected signal.

In a second aspect, the present invention provides a method for detecting at least one target from an installation, the method comprising:
 a) transmitting an interrogation signal useful for at least one of Secondary Surveillance Radar/Identification Friend or Foe (SSR/IFF) and Mode S/Mode 5;
 b) receiving a response signal from a transponder activated by said interrogation signal, said transponder being on said at least one target;
 c) receiving a reflected signal from said at least one target, said reflected signal being a reflection of said interrogation signal off of said at least one target;
 d) determining a presence of said at least one target based on at least one of said response signal and said reflected signal.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
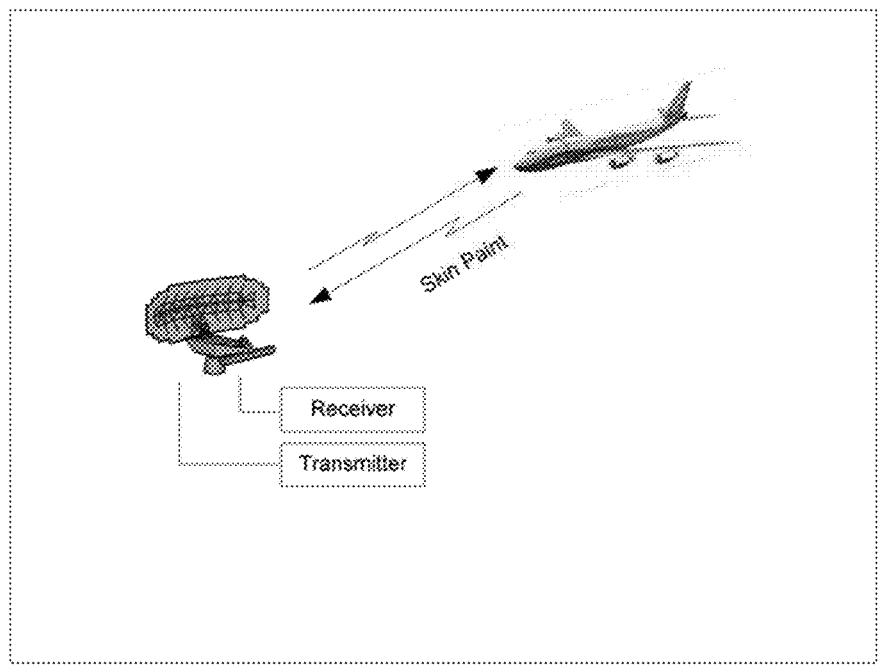
FIG. 1 is a schematic representation of a PSR.
Figure 2:
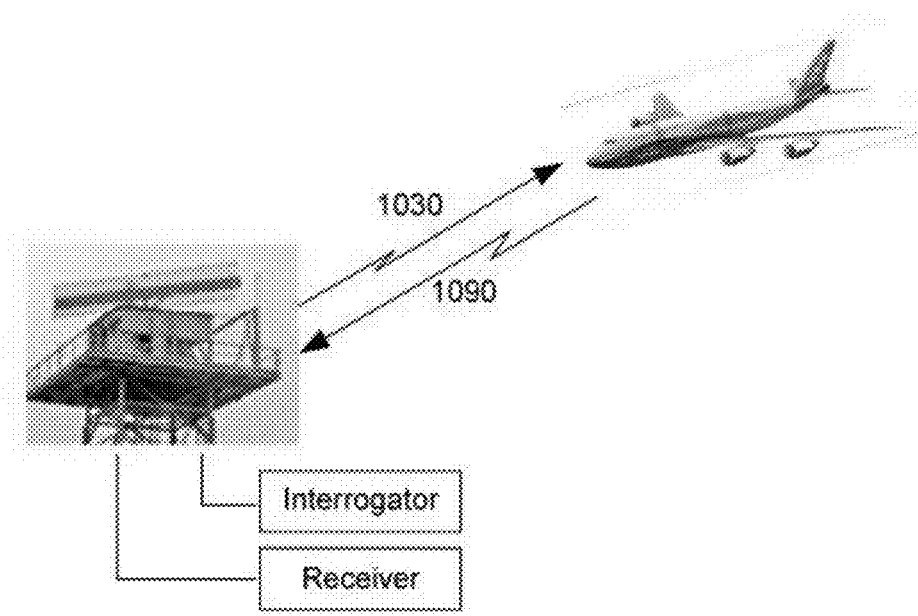
FIG. 2 is a schematic representation of a SSR/IFF.
Figure 3:
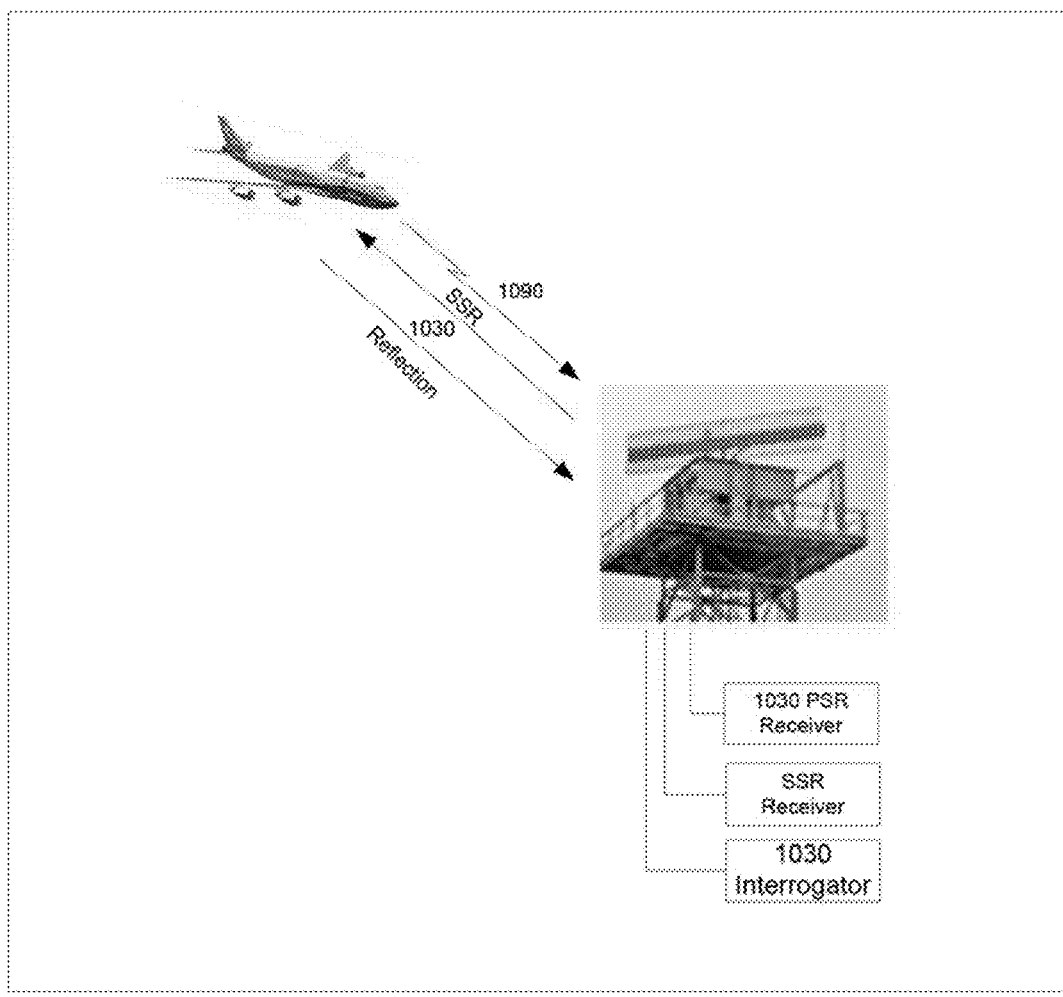
FIG. 3 is a schematic representation of the use of an SSR/IFF as a PSR according to one aspect of the invention.

The present invention relates to using one type of radar technology to accomplish the function of another type of radar technology. As noted above, SSR/IFF and Mode S/Mode 5 signals can be used to perform the function of PSR signals. The interrogation pulse for SSR/IFF and Mode S/Mode 5 signals will also cause a "skin reflection" at the interrogation frequency (see FIG. 3). By enhancing the receiver of an SSR/IFF and Mode S/Mode 5 radar it can also be used to provide PSR service.

In one embodiment of the invention, the two types of signals, with appropriate processing, are integrated to provide a coordinated PSR/SSR-IFF service. PSR traditionally uses high power (e.g. 10 kw-1 Mw) because the reflected "skin paint" signal strength decreases as the fourth power of the range (i.e. the signal has to traverse the distance to the target and back). SSR/IFF uses lower power because of the transmitter in the transponder. The signal strength decreases as the second power of the range.

However, even at this lower power, with signal processing techniques, a useable PSR service can be obtained.

The integrated service can be used for various purposes including Airport Surface Monitoring where airplanes and vehicles/baggage carts are monitored on airport runways, taxi ways and ramps. Another service for which this technology can be used is the monitoring of airspace surrounding an airport, where transponder equipped and non-transponder equipped aircraft mix. Without a PSR service, air traffic control cannot "see" or be aware of the non-transponder equipped aircraft. It should be noted that the term "vehicle" as used in this document includes all types of vehicles including land-based vehicles and all types of aircraft.

A number of techniques may be used to extend the range of SSR/IFF signals and their effectiveness for PSR purposes.

One technique is that of traditional integration of the interrogation signal pulse train when it is received as a reflected "skin paint" signal. In this technique, each interrogation pulse train can be 2 pulses, for legacy SSR/IFF. The time delay between the pulses reflects the interrogation mode, as shown in Table 1 below. For side lobe suppression, the pulse spacings are as presented in Table 1A below.

TABLE 1

INTERROGATION MODES

| MODE | P1-P3 SPACING | USER | CONTEXT |
| --- | --- | --- | --- |
| 1 | 3 µS | MIL | SECURE |
| 2 | 5 µS | MIL | SECURE |
| 3/A | 8 µS | MIL/CIVIL | TRANSPONDER CODE |
| C | 21 µS | MIL/CIVIL | ALTITUDE |
| S | 3.5 µS | MIL/CIVIL | IDENTITY, ALTITUDE POSITION ETC. |
| 5 | 3.5 µS | MIL | SECURE VERSION OF MODE S |

TABLE 1A

SIDE LOBE SUPPRESSION PULSE SPACING

| SSR/IFF | MODE S/MODE 5 |
| --- | --- |
| P1-P2 | P1-P5 |
| 2 µS | 4.35 µS |

In another aspect, this document discloses a method for detecting a presence of a remote item from an installation remote from said item, the method comprising:

a) transmitting an interrogation signal from said installation, said interrogation signal being a signal useful for activating a transponder on a transponder equipped aircraft;

b) receiving a reflected signal from said remote item, said reflected signal being a signal reflection of said interrogation signal reflected off of said remote item;

c) determining a distance and bearing of said remote item using said reflected signal;

wherein said method further comprises passing said reflected signal through a device which creates multiple delayed copies of said reflected signal such that noise in copies of said reflected signal destructively interfere with each other and said copies of said reflected signal constructively add to each other when said multiple copies are added to each other.

In a further aspect, this document discloses a method for detecting at least one target from an installation, the method comprising:

a) transmitting an interrogation signal useful for at least one of Secondary Surveillance Radar/Identification Friend or Foe (SSR/IFF) and Mode S/Mode 5;

b) receiving a response signal from a transponder activated by said interrogation signal, said transponder being on said at least one target;

c) receiving a reflected signal from said at least one target, said reflected signal being a reflection of said interrogation signal off of said at least one target;

d) determining a presence of said at least one target based on at least one of said response signal and said reflected signal;

wherein said method further comprises passing said reflected signal through a device which creates multiple delayed copies of said reflected signal such that noise in copies of said reflected signal destructively interfere with each other and said copies of said reflected signal constructively add to each other when said multiple copies are added to each other.

Up to n "sets" of interrogation pulse trains could be integrated.

To explain this technique, a background on radar ranges and the equations governing these ranges will first be provided.

The Radar Range Equation is given by Equation 1 below:

$$R^4 = \frac{P_t G A_e \sigma}{(4\pi)^2 KTBF_n \left(\frac{SNR_t}{I_n(n)}\right)}$$

Where:
R is the range
$P_t$ is the transmitter power
G is the antenna gain $$A_e = \frac{G\lambda^2}{4\pi}$$

is the antenna effective area
σ is the aircraft radar cross section
K=1.38×10$^{-23}$ J/deg is Boltzmann's constant
T is the receiver temperature in degrees Kelvin
B is the receiver bandwidth
$F_n$ is the receiver noise temperature
$SNR_1$ is the required signal-to-noise ratio to achieve a specified probability of detection,
$P_d$ and probability of false-alarm, $P_{fa}$ for a one-pulse radar
$I_n$ (n) is the integration improvement factor for n pulses on a Swerling type Target For a radar operating in a Primary Surveillance mode, typical values for the probability of detection and for the probability of false alarm are:

$P_d$(probability of detection)=0.8

$P_{fa}$(probability of false alarm)=10$^{-5}$

However, pulses from an SSR/IFF station are transmitted in pairs (mode S and Mode 5 can use an additional pulse train). In addition, their time separation is so short that an airborne target will appear stationary for each pulse of the pulse-pair. As a result, the required $P_{fa}$ for each pulse of a pulse-pair can be dramatically reduced while still maintaining a $P_{fa}$=10$^{-5}$ for the pulse-pair. In addition, Pre-detection Integration can be used to improve the $P_d$.

Each pulse will individually require a probability of false alarm of only:

$P_{fa}$(per pulse)=$\sqrt{P_{fa}}$=3.2×10$^{-3}$

The probability of detection requirement is also reduced for each pulse in a pulse-pair, since a detection of either the leading or the trailing pulse will constitute a target detection. Hence:

[1-$P_d$(per pulse)]$^2$=(1-$P_d$)

$P_d$(per pulse)=0.55

Applying the $P_{fa}$ (per pulse) and ($P_d$) (per pulse) values, the required "one pulse" radar $SNR_1$ requirement drops from a value of 12 dB=16 (for a $P_d$=0.8 and a ($P_{fa}$)=10$^{-5}$) to a value of 9 dB=8 (for a $P_d$ (per pulse)=0.55 and a $P_{fa}$ (per pulse)=3.2×10$^{-3}$).

Another advantage available in using an SSR/IFF signal as a PSR mode is that the two pulses in each pulse-pair interrogation can be integrated without consideration for fluctuations in the received pulses. In traditional PSR, the reflection of each pulse is integrated. However, the reflector (aircraft) will have moved in the interim (see FIG. 5B).

Figure 3A:
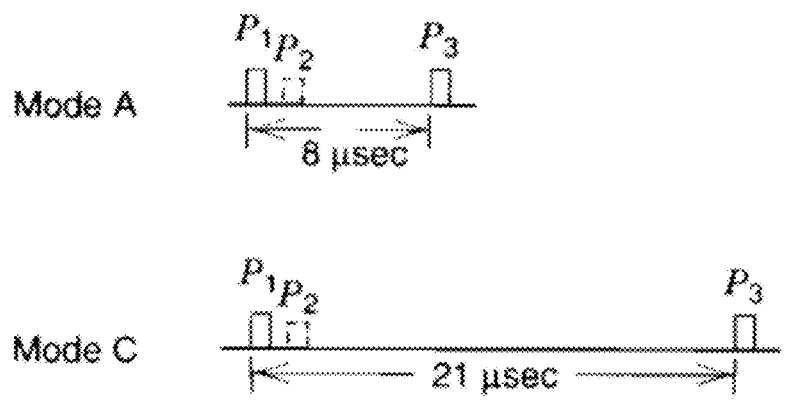
FIG. 3A illustrates Mode A and Mode C interrogation and response pulse trains.

In Mode A, each of the interrogation pulses is 0.8 μsec in duration, and the two pulses are separated by 8 μsec (see Table 1 above). In Mode C, each of the interrogation pulses is again 0.8 μsec in duration, but the two pulses are now separated by 21 μsec. Mode A and Mode C interrogation and response pulse trains are shown in FIG. 3A. Normally, interrogation signals use 1030 MHz while response signals use 1090 MHz.

Using known methods and characteristics of integrating signals and assuming post-detection (non-coherent) integration for either Mode A or Mode C, integration of the two pulses in the pulse-pair will result in an increase of the received pulse-pair signal power by a factor of 1.5.

In one study of this technique, the receiver bandwidth used was 8 MHz. This value reflects the realistic bandwidth of an RF filter used before the Analog-to-Digital Converter (ADC) in the receiver. However, the actual receiver bandwidth can be further reduced after the ADC, using a digital filter in the Digital Signal Processor (DSP). In addition, because a Finite Impulse Response (FIR) digital filter has zero group delay variation with frequency (dispersion), this bandwidth can be reduced to 1/τ where τ is the individual pulse length of 0.8 μsec. This yields a band-pass bandwidth of 1.25 MHz, resulting in a reduction in receiver noise of a factor of 6.

Applying the combined enhancements of a reduction in the "one pulse" radar $SNR_1$ requirement of a factor of 2, and the increase in the received pulse-pair signal power of 1.5, results in a decrease in the required transmitter power for a given range. Studies have shown that a transmitter power of 5 KW was required to provide a range of 31.6 nautical miles. With the above improvements, the required transmitter power to provide this same range can now be reduced to:

$P_t$ = 5 KW/(2×1.5)

= 1.67 KW

Now, using the Radar Range Equation above, the increase in receiver sensitivity due to reduced bandwidth can provide an increase in range performance (or a further decrease in required transmitter power). Since the range to the fourth power is inversely related to the receiver sensitivity, the new range value as compared to that from the previous feasibility study can be found as:

R = 31.6 nautical miles × 6$^{1/4}$

= 49.5 nautical miles

From the above numbers, using the enhancements noted, using SSR/IFF signals as PSR will be effective out to a range of approximately 50 miles from the radar installation. The above calculation only takes into account the P1-P3 pulse pair. However, this technique can be enhanced using P1, P2 and P3. For a special case of PSR operation, P2 (Side Lobe Suppression Pulse—2 microseconds after P1—see Table 1A above) would have the same power as P1 and P3. This would result in a stronger integrated PSR reflection signal, but no SSR responses. If P2=(P1 or P2)−9 db, this would allow SSR responses as well as providing an improvement in the PSR reflection signal over just the P1-P3 pair.

Figure 3B:
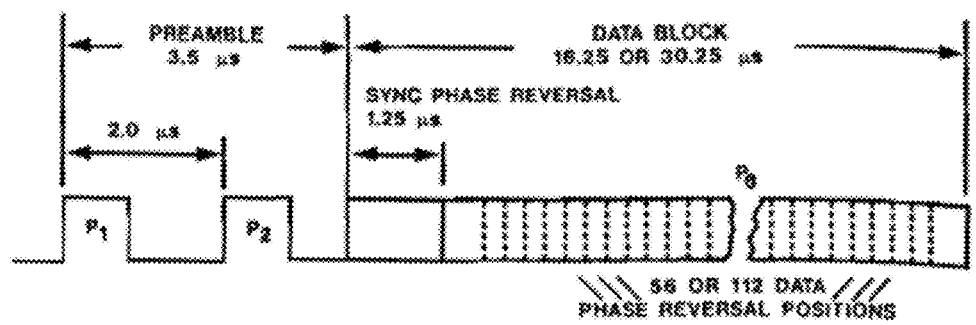
FIG. 3B illustrates a Mode S and Mode 5 interrogation pulse train.
Figure 3C:
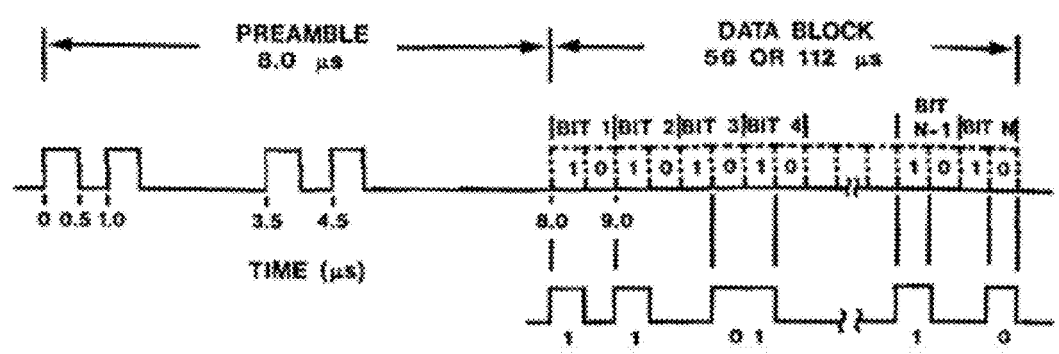
FIG. 3C shows a Mode S/Mode 5 response pulse train.

Again, the above calculations only take into account the use of Modes A and C in SSR/IFF signal generation. In Mode S of SSR, and Mode 5 of IFF, the first interrogation pulse is again 0.8 μsec long, but the trailing pulse is either 16.25 μsec or 30.25 μsec in duration. Further, this trailing pulse carries differential phase shift keying (DPSK) data at a rate of 4 Mbps. Mode S interrogation and response pulse trains are shown in FIGS. 3B and 3C, respectively.

Upon reception, the trailing pulse can be considered as a sequence of closely spaced return pulses, each of duration τ=1/4 Mbps=0.25 μsec. Consequently, it can be considered as a sequence of either 65 pulses or 121 pulses.

Using known techniques and assuming worst case post-detection (non-coherent) integration for the Mode S and Mode 5, it can be computed that the pulse-pair integration will result in an increase of the received pulse-pair signal power by a factor of 22, or 35. However, this technique can be considered as pre-detection (coherent) integration with, for perfect integration, a factor of 65 or 121 improvement.

It should be noted that for Mode S and Mode 5, due to the 4 Mbps Differential Phase Shift Keying modulation, the bandwidth needed after the Analog-to-Digital Converter in the receiver cannot be dramatically reduced when compared to the 8 MHz used in the above noted study. However, due to the length of the trailing pulse, either 65 or 121 samples can be summated to realize a greatly improved integrated signal-to-noise ratio.

Regarding power requirements and range performance for Mode S SSR and Mode 5 IFF, the above enhancements decrease the power requirements and extends the range of PSR signals. Applying the combined enhancements of a reduction in the "one pulse" radar $SNR_1$ requirement of a factor of 2, and the increase in the received pulse-pair signal power of either 22 or 35, results in a decrease in the required transmitter power for a given range. Of the combined available factor of either 44 or 70, a component of 3 can be allocated for the reduction in the transmit power to achieve a required transmit power of 1.67 KW as for the Mode A and Mode C SSR. This leaves a component of 7 or 11 to be allocated for the increase in range. From previous studies, it was determined that a range of 31.6 nautical miles was achievable. With the above improvements, the achievable range can now be increased to:

$$R = 31.6 \text{ nautical miles} \times 7^{1/4}$$
$$= 51.4 \text{ nautical miles for the 16.25 } \mu\text{sec trailing pulse, and:}$$

$$R = 31.6 \text{ nautical miles} \times 11^{1/4}$$
$$= 57.5 \text{ nautical miles for the 30.25 } \mu\text{sec trailing pulse.}$$

In terms of performance, the minimum measurable range for the PSR operation of the SSR equipment is determined by the pulse length of the P1 and P3 interrogation pulses. In addition, blind ranges exist due to the delay interval between P1 and P3, as well as between P1 and P2 (Side Lobe Suppression Pulse). These blind ranges exist since a return from P1 will not be detectable when the SSR is radiating the P2 or the P3 pulse. The minimum measurable range is defined as that distance causing the leading edge of the pulse (P1 or P3) to arrive back at the PSR just after the trailing edge of the pulse is transmitted.

$$R_{min} = c\tau/2$$
$$= 3 \times 10^5 \text{ Km/s} \times 0.8 \times 10^{-6} \text{ s}/2$$
$$= 0.12 \text{ Km} = 0.065 \text{ nautical miles}$$

This very short minimum range is acceptable, especially for ground based applications.

It should be noted that while this minimum range is very small, there will be two blind ranges during which the P1 pulse cannot be received. These blind ranges correspond to the delay of pulse P2 and P3 after P1.

$$R_{blind} = cT/2$$

For Mode A and Mode C, the delay for P2 is 2 μsec. For Mode A, the delay for P3 is 8 μsec, while for Mode C, it is 21 μsec. Hence the blind ranges become:

$$R_{blind} = 0.3 \text{ Km and } 1.2 \text{ Km, for Mode } A$$
$$= 0.162 \text{ nautical miles and } 0.648 \text{ nautical miles,}$$
for Mode $A$ And:

$R_{blind}$
=0.3 Km and 3.15 Km, for Mode C
=0.162 nautical miles and 1.70 nautical miles, for Mode C So Mode A only could be selected for short range PSR. Alternatively, a P1 only pulse could be used for shorter range (a P1 only pulse will be ignored by transponders)

For Mode S, the delay for P2 is again 2 μsec, while that for the trailing pulse is 3.5 μsec. However, the trailing pulse lasts for 16.25 or 30.25 μsec. This extended duration of the trailing pulse renders P1 unusable, and the PSR operation must be based solely on the use of the trailing pulse.

Using the above noted enhancements, an SSR signal feeding a large aperture antenna will need the following parameters:

$P_t$=2 KW
G=36 dB=4000
B (after the ADC)=1.25 MHz
$F_n$=10 dB (typical)
Number of Interrogations (pulse pair Integration)=10
f=1030 MHz (λ=0.291 m)

The above parameters will enable the SSR operating in either Mode A, Mode C, or Mode S to act as a PSR out to a range of 50 nautical miles for airborne targets having a cross section as small as 2 $m^2$ and fluctuating on a pulse-pair to pulse-pair interval as a Swerling 2 target.

Figure 4:
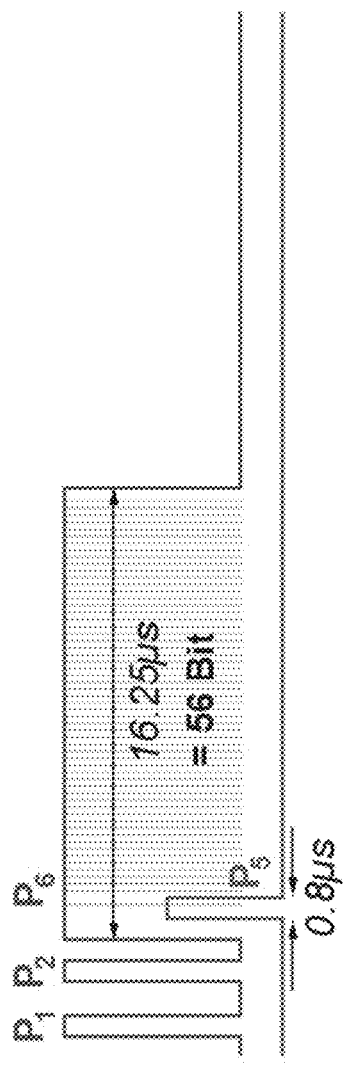
FIG. 4 illustrates a pulse sequence for a 56 bit long format for Mode S interrogation.

Following from the above, the Interrogation pulse train can be up to 112 pulses for the newer mode S (Selective) operation (see FIGS. 4 and 5).

Figure 5A:
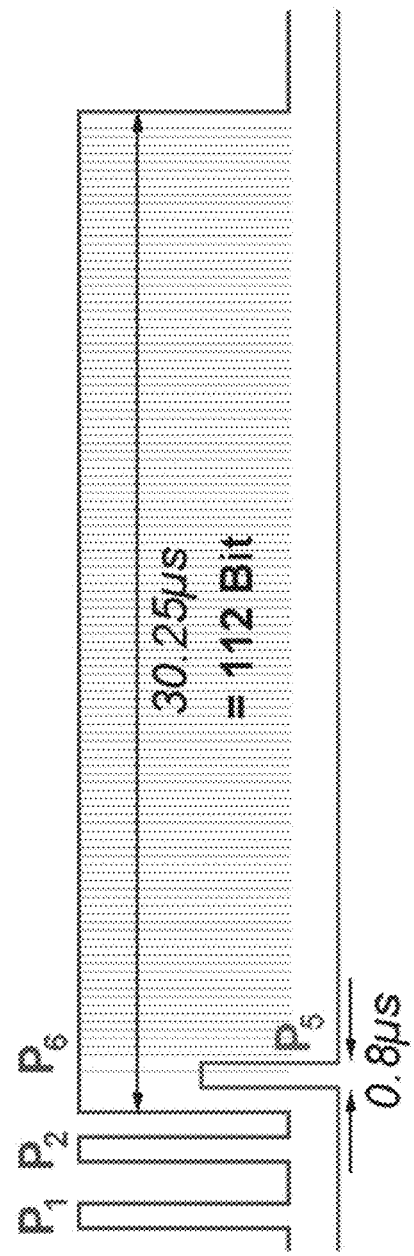
FIG. 5A illustrates a pulse sequence for a 112 bit long format for Mode S interrogation.

Referring to FIG. 4, if one uses Mode S, the Mode S up link interrogation format starts with two pulses, $P_1$ and $P_2$, which are solely for the purpose of suppressing existing Mode A/C only transponders so that they are not aware of the main Mode S information. The Mode S interrogation data contained in the $P_6$ data block is phase modulated (Differential Phase Shift Keying). The first phase reversal is the timing point for the subsequent bits (chips) of information. The Mode S interrogation may be of short (56 bits) or long (112 bits) format. FIG. 4 shows the pulse sequence for a 56 bit long format while FIG. 5A shows the pulse sequence for a 112 bit long format.

Figure 5B:
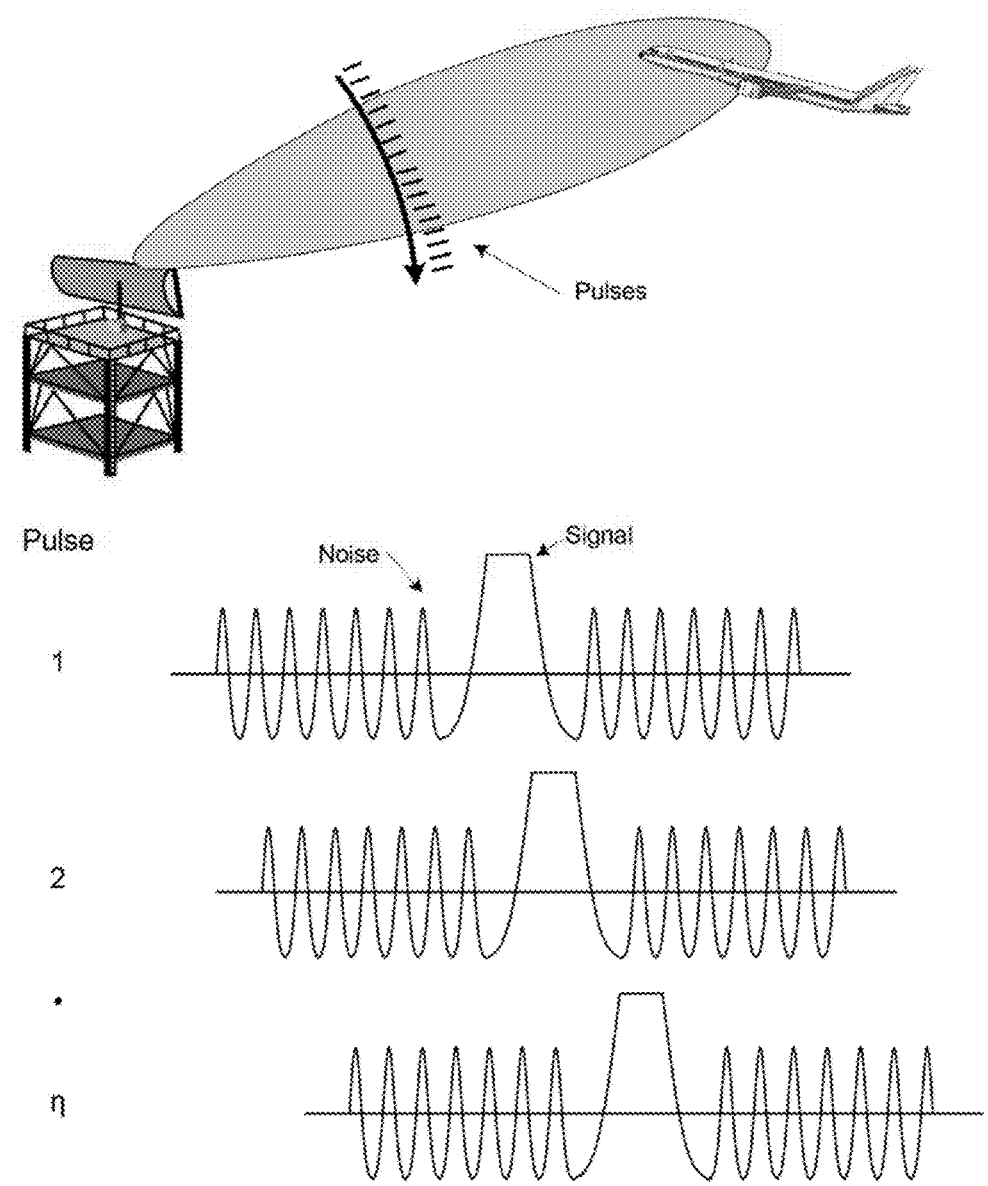
FIG. 5B illustrates the effect of integration of reflected signals.

Another technique which might be used uses integration of each of the received pulses from the reflected "skin paint" signal with time-delayed copies of each pulse. The concept is to use some form of delay line to obtain multiple delayed copies of the return or reflected signal and then to sum all copies for a better signal. To explain the integration of the reflected signals, FIG. 5B is provided. In FIG. 5B, the installation 500 transmits pulsed SSR signals towards the aircraft 510. The return signals (reflected off of the aircraft) are also pulsed and are received with background noise as shown in the waveforms.

In Primary Radar, the Signal to Noise Ratio (SNR) of the "skin paint" reflection from a target is improved by integrating "returns" from a number of "pulses" (see FIG. 5B). There are two types of integration:

Pre-detection Integration, also known as Coherent Integration. (uses both phase and amplitude in the integration)

Post detection Integration also known as non-coherent. (uses amplitude only in the integration)

Pre-detection integration, in theory, is more powerful than post detection integration. However, in practice for traditional PSR, the phase of returns from a moving target is not coherent and the elapsed time of the return is not constant for Time integration (see FIG. 5B). This is not the case for delayed single pulse (and pulse train) integration (see FIG. 8).

Pre-detection integration takes advantage of the fact that the noise in each return is random (so tends to average to zero) while the signal in each return constructively adds. By delaying the various return signals received, the delayed signals can be summed to provide a better signal for analysis to determine aircraft's location and speed. A circuit such as that in FIG. 6 may be used to delay the various return signals received.

Figure 6:
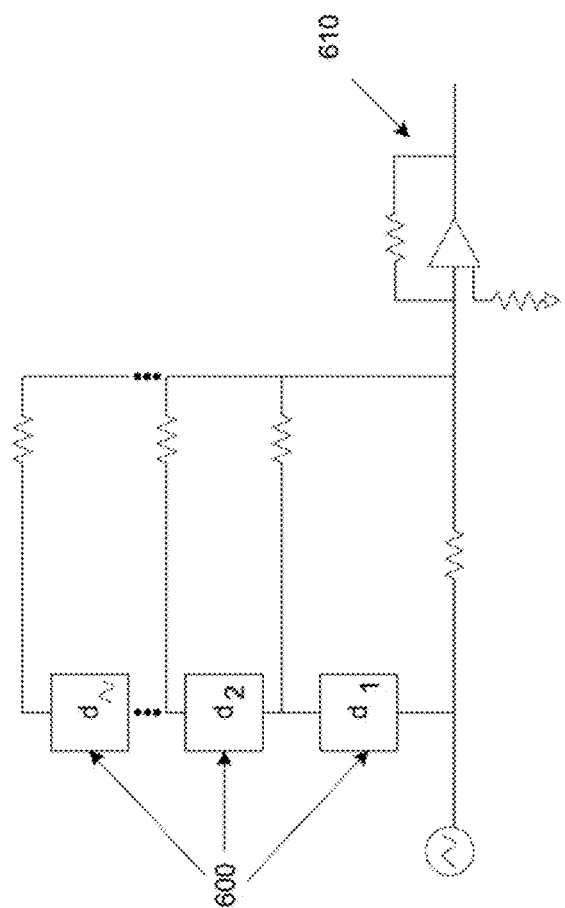
FIG. 6 is a circuit diagram illustrating the use of delay elements.

Referring to FIG. 6, a number of delay elements 600 each feed an Integration Device (for example, an operational amplifier, DSP software, etc.) subsystem 610.

For the above circuit and the concept, one question relates to the amount of the delay. What is the minimum delay to minimize noise coherence (noise de-correlation) between delayed signals? There will be some noise coherence caused by limiting bandwidth.

For pulse waveforms, the optimum bandwidth is $1/\tau$ (where $\tau$ is the pulse width). With an 800 ηs pulse, the optimum noise bandwidth is 1.25 MHz.

Figure 7:
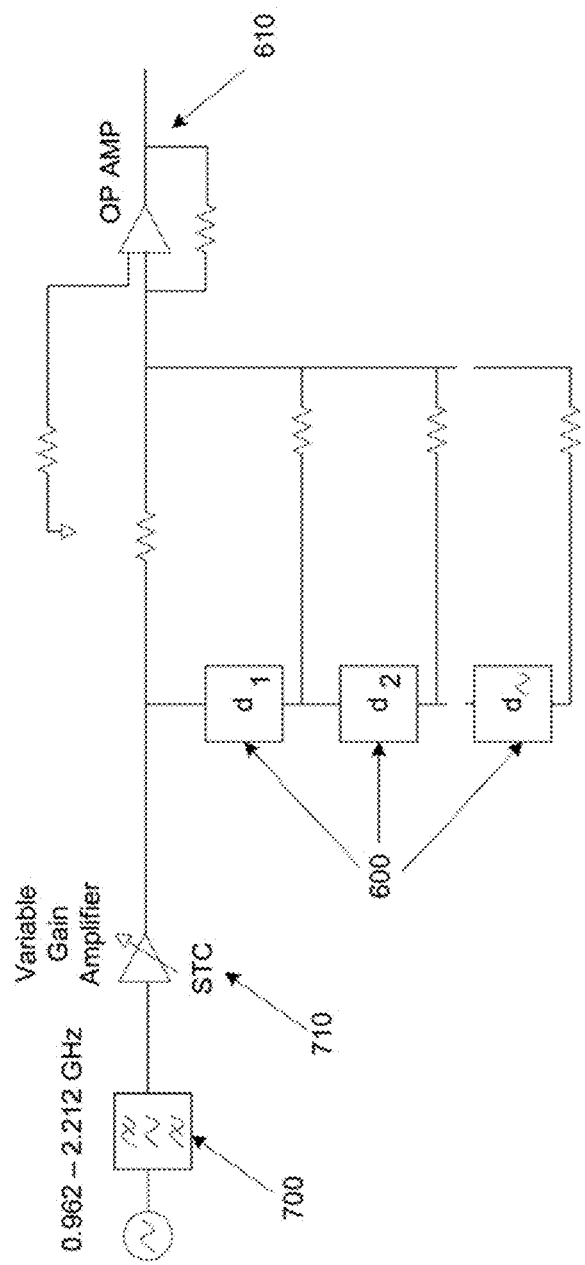
FIG. 7 is a circuit diagram of a system using the base circuit in FIG. 6.

Since current SSR/IFF systems use pulses at 1030 MHz, if we use a 1.25 MHz filter an example circuit will be as shown in FIG. 7 which incorporates the circuit in FIG. 6.

Referring to FIG. 7, a block diagram of an example circuit for delaying SSR/IFF signals is illustrated. As can be seen, a bandpass filter 700 feeds a Variable Gain Amplifier 710 for Sensitivity Time Control (STC). The output of the Variable Gain Amplifier then feeds the delay elements 600. The output of the circuit is taken from the operational amplifier 610. In operation, the amplifier will provide Sensitivity Time Control. The gain will be turned very low before the transmit pulse so that the receiver is not overwhelmed by large returns from close-in aircraft (i.e. nearby aircraft). The gain will be increased with time to improve performance for aircraft further out.

Figure 8:
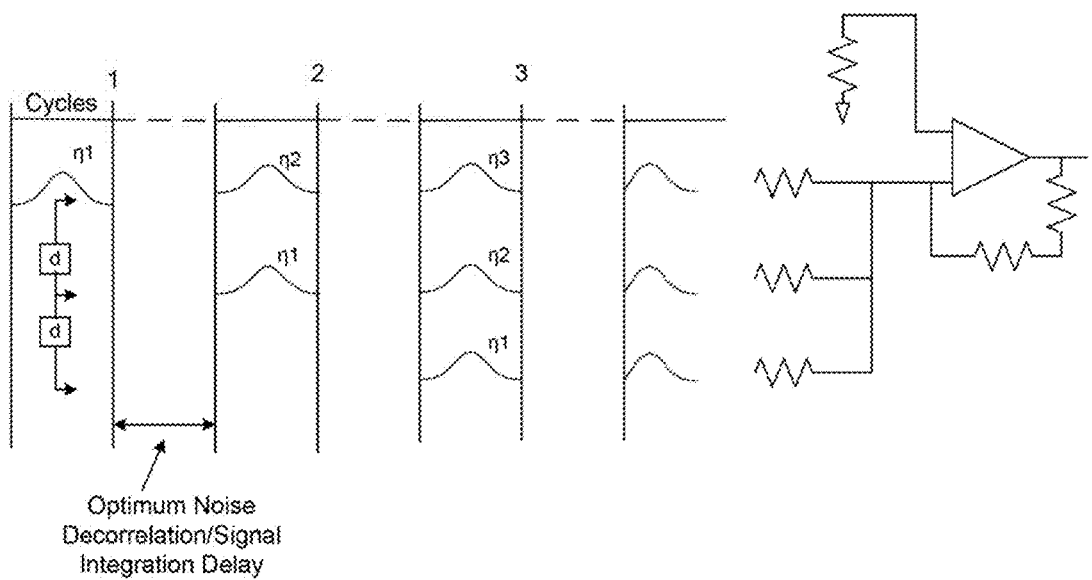
FIG. 8 illustrates the effect of the addition of signals and noise sources.

If the delay is set for the optimum noise de-correlation/ signal integration delay, then the addition of signal and noise sources will be as seen in FIG. 8. As can be seen, during cycle 2, the signal and noise from cycle 2 will be added to signal and noise from cycle 1. Similarly in cycle 3, the signal and noise from cycle 3 will be added to cycle 2 and cycle 1 and so on and so forth. The optimum delay will minimize noise coherence (correlation) and maximize signal integration.

Depending on the implementation, the coherence may be low. If coherence is low from sine wave to following sine wave within the pulse, the delay may be implemented as part of a cycle representing say 15° (0.042 ηs), 30° (0.084 ηs), 45° (0.226ηs), 60° (0.168 ηs), 75° (0.240 ηs) and 90° (0.284 ηs). A ratio of noise per degree can be developed to determine the optimum phase delay. A practical implementation of such a circuit would be simple to fabricate (see FIG. 9).

Figure 9:
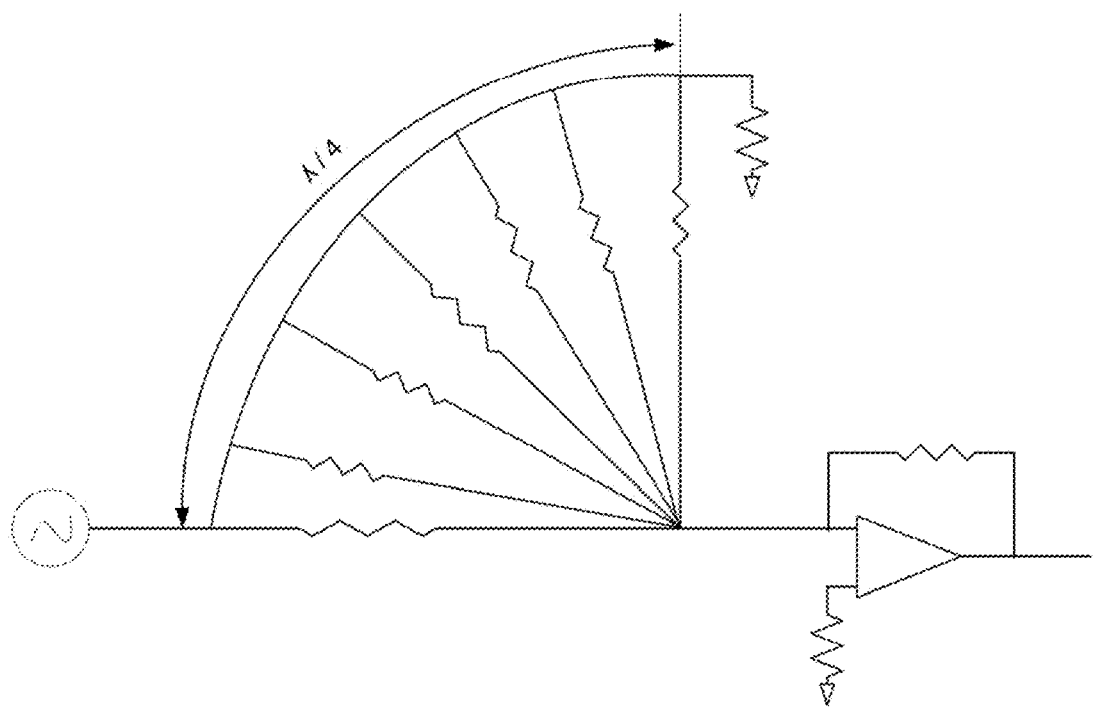
FIG. 9 is a circuit diagram of a practical implementation of a circuit which may be used to implement delay elements for reflected SSR/IFF signals.

Referring to FIG. 9, a delay line representing the wavelength $\lambda/4$ can be implemented as a Printed Circuit Board (PCB) trace. This can be tapped at the required lengths to provide the required Phase delays. For A of 30.48 cm (1030 MHz), this represents a trace length of 7.6 cm. Note that after 90°, the signal will start to subtract.

For some applications (e.g SSR/IFF), the centre frequency, tolerance and bandwidth are tightly controlled such that methods of improving PSR detection (e.g., CHIRP) are prohibited. A "dense pulse" can be created using delay and an Integration Process (e.g. Operational Amplifier, DSP, etc.). A possible circuit for an Operational Amplifier is shown in FIG. 10.

Figure 10:
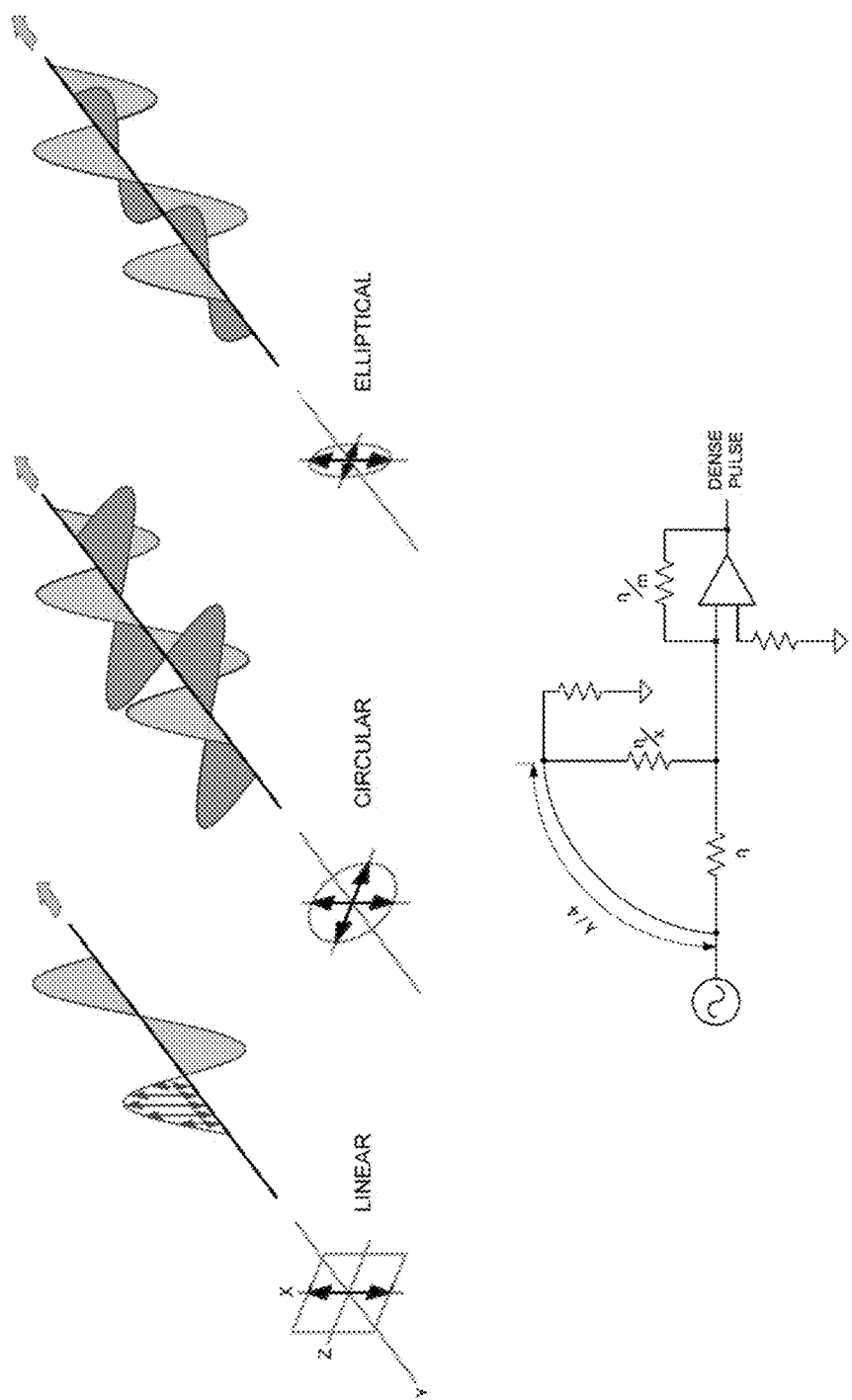
FIG. 10 is a circuit diagram for creating a "dense pulse" as well as an illustration of different types of polarization.

In FIG. 10 the circuit is set up to normalize the output voltage to the desired working output voltage. In FIG. 10, the power output will represent the power of 2 sine waves rather than 1.

If a wave is composed of two plane waves of equal amplitude but differing in phase by 90°, then the wave is said to be circularly polarized. If two plane waves of differing amplitude are related in phase by 90°, or if the relative phase between the two waves is other than 90°, then the wave is said to be elliptically polarized. In FIG. 10, if x=η, then wave is circular. If x≠η, then the wave will be elliptical.

With a single sine wave, the power is in the X, Y planes. Adding phase-delayed sine waves puts power into the Z plane. (See FIG. 10)

Another technique is to use two or more frequencies around the specified carrier frequency, as used in the Intermodulation Distortion Detection technique (described below). Having sine waves at different phase angles, or two or more frequencies, will improve "Glint" (phase induced tracking errors). Scattering centers will be different for different phases and frequencies.

More power on the target will certainly improve detection. Where the Optimum Noise De-correlation/Signal Integration Delay technique is not feasible because of strong noise coherence between pulses, a Zero/π modulation technique can be used. It can be applied to the SSR/IFF pulse pairs. However, it is even more usefully applied to the Mode S SSR/Mode 5 IFF Interrogation pulse train because of the greater signal integration due to the longer pulse train. Here, successive pulses in the pulse train change phase by 180 degrees.

Figure 15:
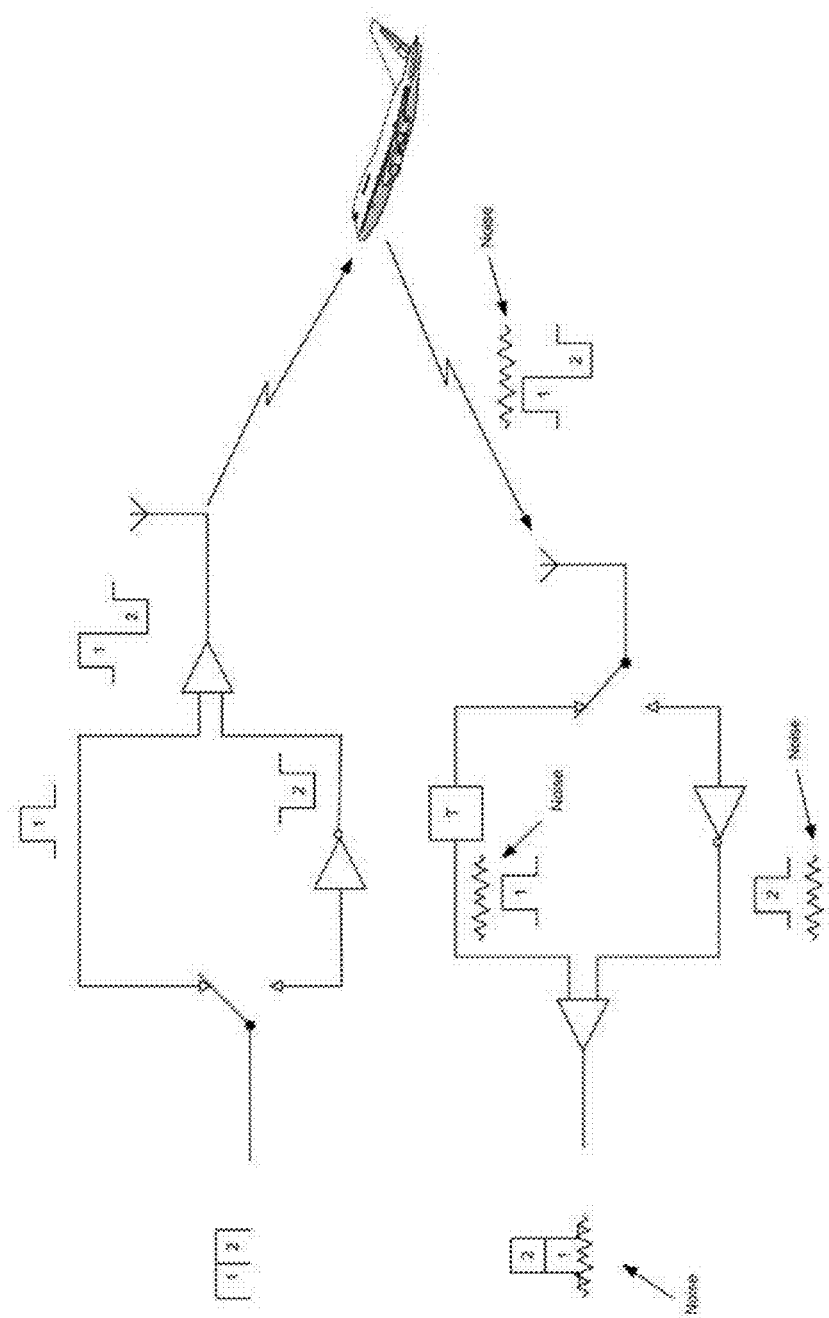
FIG. 15 illustrates the technique of Twin Inverted Pulse processing to reduce coherent noise.

In use, a PSR specific Mode S/Mode 5 pulse train would have the even (or odd) numbered pulses have a π(180 degree) phase shift (inversion) relative to the otherwise identical odd (or even) numbered pulses (see FIG. 15). Upon reception of the reflected signal, the π phase shift is removed (inverted). During integration, the (inverted) π pulses add constructively with the zero pulses. When the coherent noise is received, it experiences the compensating phase shift (inversion) of the π pulses. However, because the coherent noise does not experience the initial π phase shift, the coherent noise adds destructively with the sample of coherent noise that accompanies the Zero phase pulses. This results in a reduction or cancellation of the coherent noise while preserving and improving the desired signal.

While implementation in the analog domain would introduce amplitude and phase imperfections that limit cancellation of coherent noise; nearly perfect implementation can be realized with the introduction and removal of the π phase shift in the digital domain.

Aircraft will ignore the PSR interrogation if the P2 pulse is at a similar power level to the P1/P3 pulse (SSR/IFF) or if the P5 pulse is at a similar level to the P6 pulse (Mode S/Mode 5) or if the P6 pulse did not have a phase reversal.

Figure 12A:
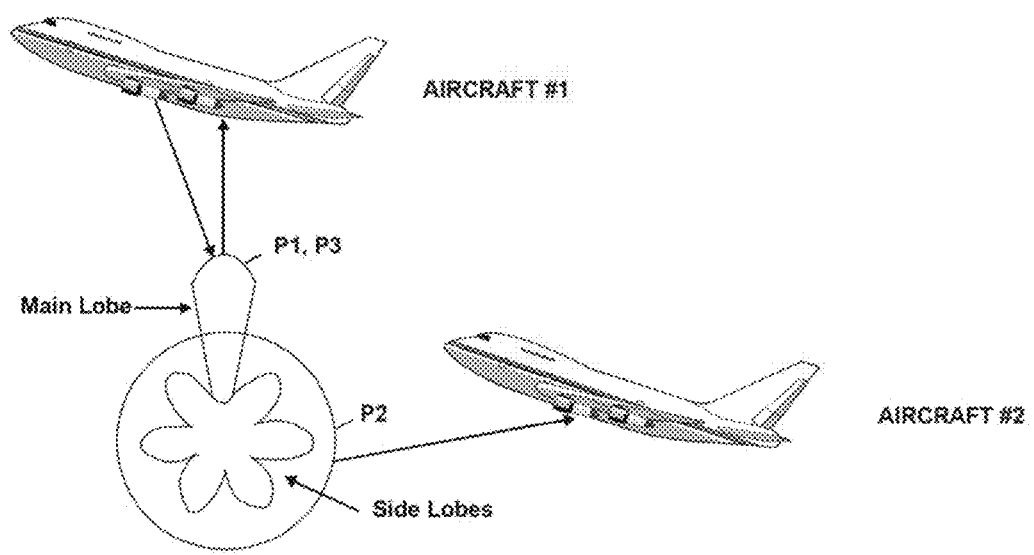
FIGS. 12A and 12B illustrate the PSR interrogation sequences when utilizing SSR/IFF.
Figure 12B:
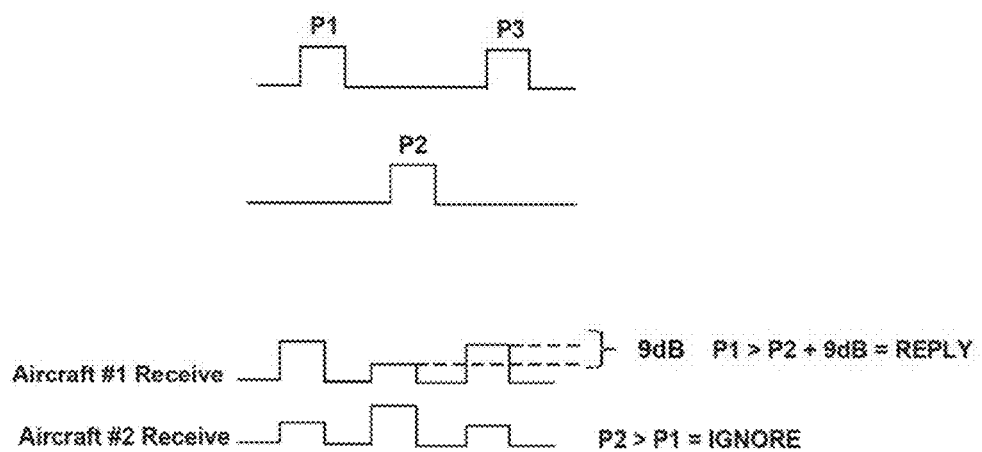
Figure 13A:
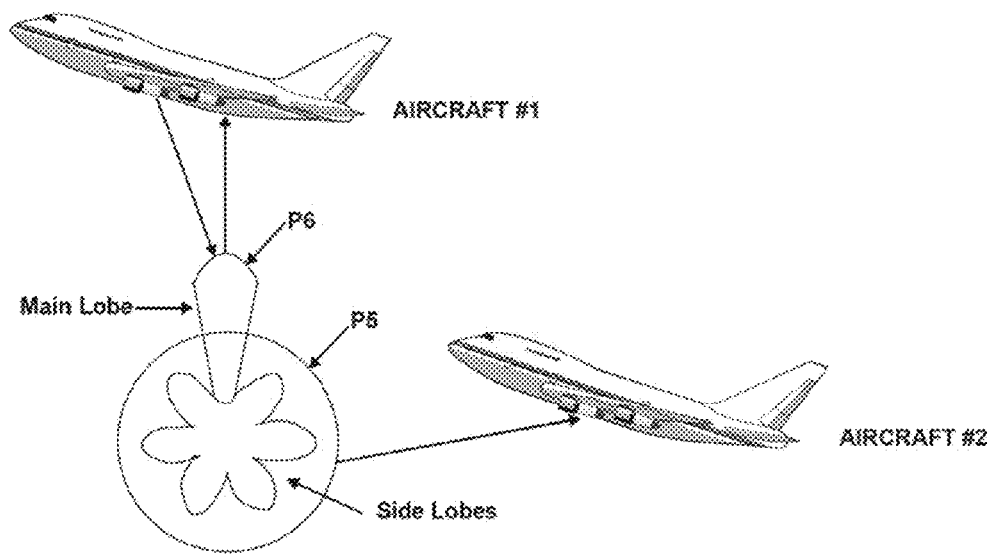
FIGS. 13A and 13B illustrate the PSR interrogation sequences when using Mode S/Mode 5.
Figure 13B:
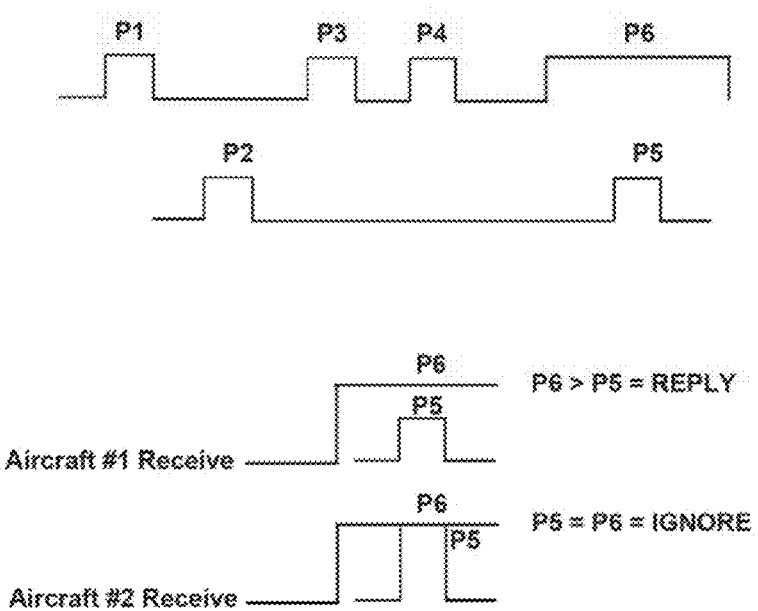

Alternatively, a test or dummy address can be used as the subject aircraft for Mode S/Mode 5 interrogation. For illustrations of the above, see FIG. 12A in conjunction with FIG. 12B and FIG. 13A in conjunction with FIG. 13B.

Yet another possible technique for improving SSR/IFF and Mode S/Mode 5 performance when used as a PSR is to use the SSR/IFF signal as a twin inverted pulse radar (TWIPR. In this technique, two pulses are transmitted in quick succession, with the second pulse being identical to the first pulse but phase inverted. This is done to distinguish between linear (skin reflection) and non-linear scatterers. Non-linear scatterers include "diode" type elements where the response at one phase is significantly greater than the response at 180 degrees (can be up to a factor of 50 dB above clutter, as shown by tests by Leighton et. al.) in this application, "diode" type elements include Air-Ground and Ground-Ground Radios; Transponders, Navigational Aids, Sat Nav data links, Radio Altimeter, etc. It should be noted that, according to some sources, these can be detected even when powered down.

The above technique requires the radar receiver to operate at a harmonic of the transmitter. It may have difficulties with interference from other emitters operating in the same band of the harmonic. Finally the propagation losses in the harmonic band may be excessive.

Figure 16:
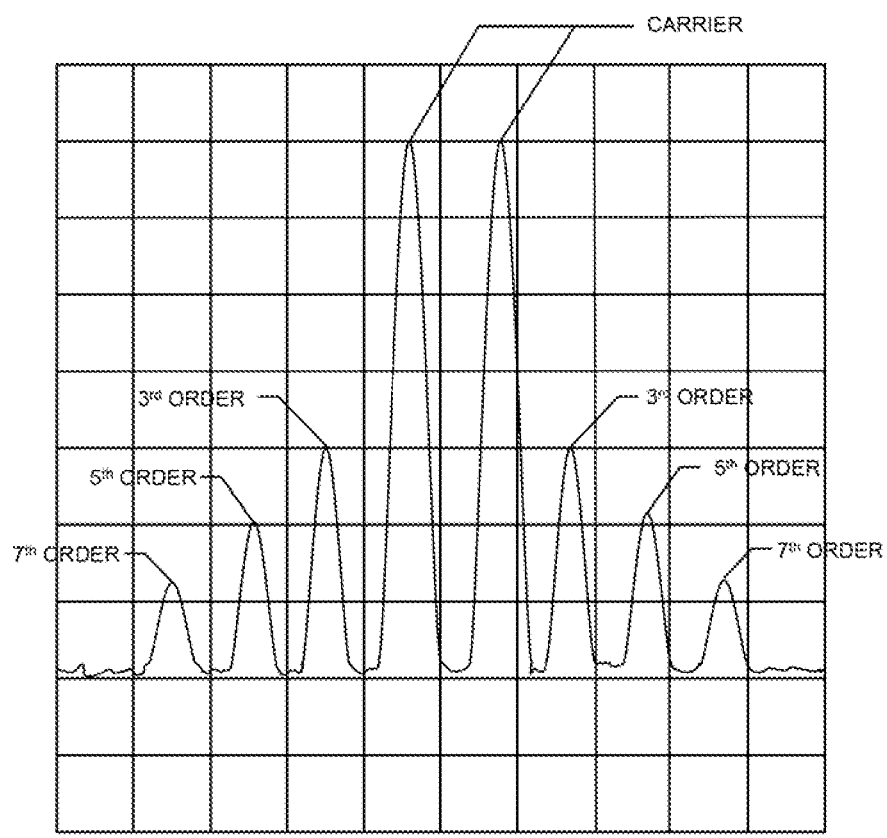
FIG. 16 shows the effect of Intermodulation Distortion.

Rather than transmitting the twin inverted pulses having a single carrier frequency, the twin inverted pulses can be generated with two or more closely spaced carriers (in the same band) to create an Intermodulation Distortion Detection Radar (IDDR). Intermodulation Distortion (see FIG. 16) is the result of two or more signals interacting in a non-linear device to produce additional signals. Rather than focusing on the harmonic generated by the aircraft's non-linear equipment (e.g. transceivers, navigational aids etc), the "multiple carrier twin inverted pulse radar" can focus on one or more third-order intermodulation product image frequencies generated by the aircraft's non-linear equipment. Since the image frequencies are spaced from the two or more carriers by the same difference in frequency between the multiple carriers, they are in the same radar band. As a result, interference from other emitters in the harmonic bands is removed, and the propagation losses are the same as for the transmitting pulses. Also, the receiver front-end is at the same frequency as the for the transmitter. In addition, the image frequencies can be easily separated from the "basic" reflections of the carrier frequencies. For optimum separation of the image frequencies from the carrier frequencies, the difference in frequencies should be $\Delta f \geq 1/\tau$. This, for example, allows the "active" targets to be highlighted/discriminated from background "clutter" (e.g. buildings, trees, etc.) at the carrier frequencies. Where a "diode" device is preceded by a filter for a different frequency than the carrier frequencies (e.g. a pass-band filter for air-ground radios at 108-137 MHz with carrier frequencies at 1030 MHz) that would attenuate the effect of IDDR, the passband filter will cause an enhanced reflection of the carrier frequencies as well as frequencies at the image frequencies.

If a "Dense Pulse" is used with multiple phase offset signals, the effect will be even greater. This technique is similar to the use of twin inverted pulse sonar (TWIPS) that has been shown to be effective in distinguishing targets from bubble clutter. With this technique, an inexpensive, passive reflector (e.g. a diode connected to a wire antenna tuned to resonate at a selected frequency (say 1030 MHz, or a harmonic of 1030 MHz)) could be used on vehicles, baggage carts, baggage, etc., to provide better signal to background discriminating. Both normal and harmonic processing can be used in processing the reflected signal. It should be noted that transponders for SSR/IFF are not sensitive to the phase of the interrogation signal.

It should also be noted that the phase inversion may take various forms. The inversion could be the inversion of the second pulse in legacy SSR/IFF or it could be inversion of the second half of the each of the two pulses in legacy SSR/IFF. If using Mode S or Mode 5, the inversion could be inversion of each subsequent pulse in the mode S interrogation or it could be inversion of each subsequent block of pulses (e.g. the 112 pulse interrogation pulse train could be divided into 28 blocks of 4 pulses).

Yet another potential technique for improving SSR/IFF and Mode S/Mode 5 signal effectiveness when used as a PSR is the use of Doppler Processing, Moving Target Detection and/or Moving Target Indication to extract the moving target reflected signal from stationary or slow moving "clutter". The traditional techniques can be improved using Zero/$\pi$ modulation and/or TWIPR techniques.

Figure 11:
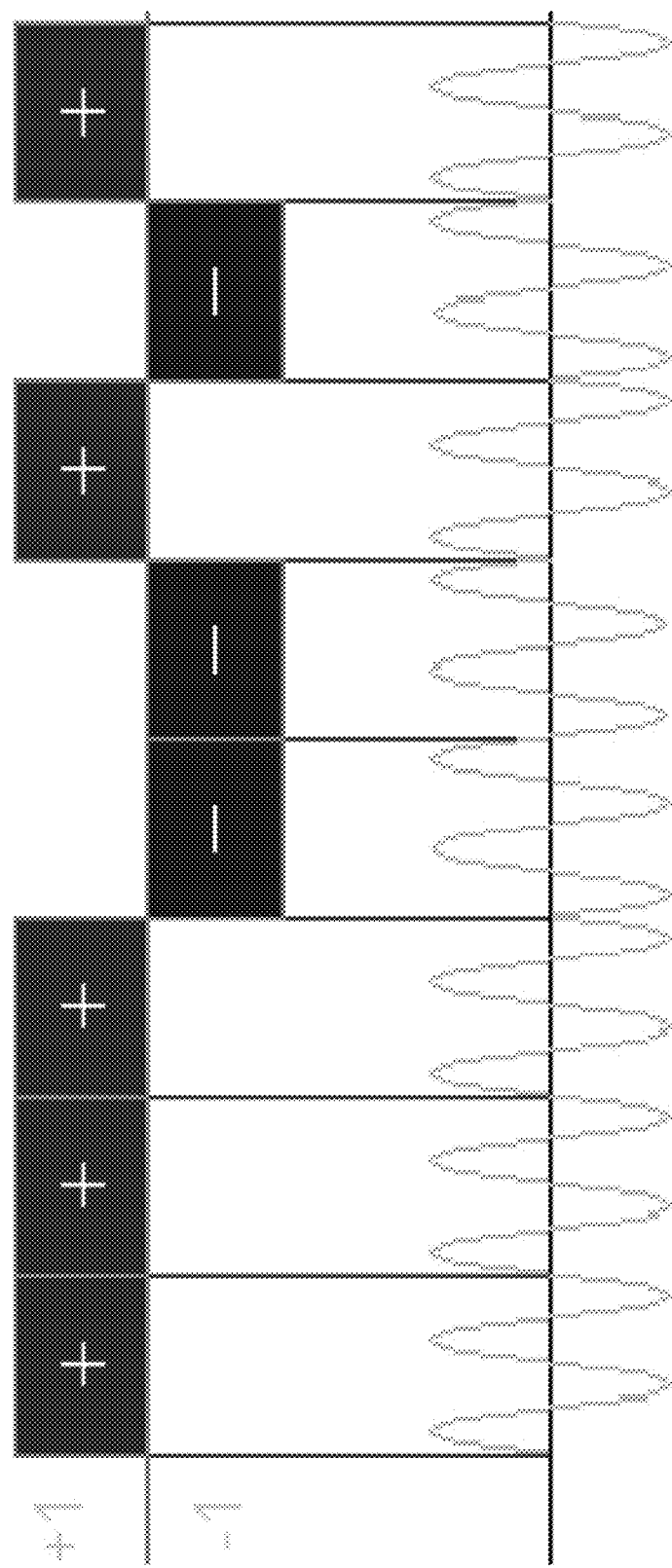
FIG. 11 illustrates the use of Barker codes in PSR interrogation signals.

Yet another potential technique for improving SSR/IFF and Mode S/Mode 5 signal effectiveness when used as a PSR is the use of Optimal Binary Sequences (such as Barker codes). These are binary codes consisting of a sequence of either +1 and −1. The phase of the transmitted signal alternates between 0 and 180° in accordance with the sequence of elements. This can be used with a phase code, as shown in FIG. 11. Barker codes are optimal in the sense that they provide low sidelobes, which are all of equal magnitude, and improve the Signal to Noise Ratio and the range resolution. Optimal Binary Sequences (e.g. Barker codes) can be used in the Mode S/Mode 5 interrogation pulse train.

If Optimal binary sequences are used, the method would include using the first part of the Mode S interrogation to contain the address of the subject aircraft. This address could, for PSR operation, be set to an innocuous address (test or dummy address, etc.) Aircraft would ignore this interrogation. One or more (compound) Optimal binary Sequences (e.g. Barker codes) could then be incorporated into the second part of the Mode S interrogation. Another method of incorporating the binary code into the mode S interrogation pulse is to set the P5 pulse power/level equal to that of the P6 pulse. This can also be done by having a "special" P6 pulse with no phase change at the P5 position—this eliminates the need for the P5 (see FIGS. 13A and 13B). All Mode S SSR and Mode 5 IFF aircraft will ignore this interrogation (the phase transition in the P6 pulse will be masked or will not be present).

Figure 14:
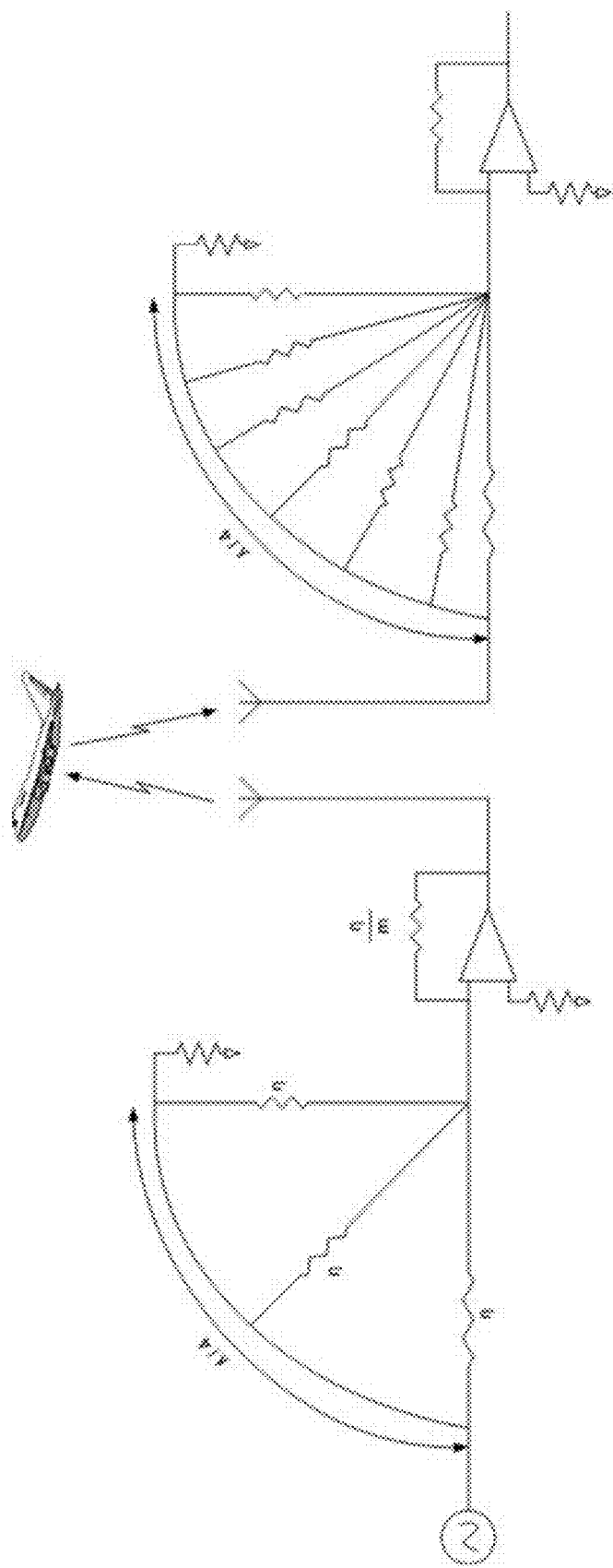
FIG. 14 illustrates a technique for improving SSR/IFF signal effectiveness when used as a PSR by the use of a "dense pulse" transmitter with a "dense pulse" receiver.

Yet another potential technique for improving SSR/IFF signal effectiveness when used as a PSR is the use of a "dense pulse" transmitter with a "dense pulse" receiver. This technique will provide a major improvement in received signal correlation at the expense of noise. The number of delayed sine waves integrated in the transmitter will likely be limited by the power handling of the transmitter, and specification on maximum pulse width. However, the number of delayed sine waves integrated in the receiver will only be limited by the maximum PSR received pulse width allowed. For an illustration of this technique, see FIG. 14.

In one embodiment, the present invention can be used to locate aircraft, both transponder equipped and non-transponder equipped, and ground based items including vehicles, baggage carts, and other items or sizable debris that might be present near an airfield or radar installation. This is done by transmitting an SSR/IFF or Mode S/Mode 5 interrogation signal and then receiving return signals that are reflected versions of the interrogation signal. The return signals are then processed to determine the distance and location of the item the interrogation signal reflected off of. The item may be a ground-based vehicle, an airborne aircraft, a parked aircraft, a taxiing aircraft, or any other item which is capable of reflecting the SSR/IFF or Mode S/Mode 5 interrogation signal. As noted above, the interrogation signal may be pulsed and the pulsed signal may be configured such that the pulses are differentially phased (i.e. have different phases).

It should be noted that this technique also applies to multilateration systems which use geographically dispersed ground systems that receive SSR/IFF signals. These ground systems time stamp the received signals send them to a central system. The central system performs time delay of arrival processing to obtain the location of the target.

The following references may be consulted for a more thorough understanding of the present invention. These references are hereby incorporated in their entirety by reference.

Radar clutter suppression and target discrimination using twin inverted pulses T. G. Leighton et al; Proceedings of the Royal Society A; Mathematical, Physical and Engineering Science; 23 Oct. 2013

Extending Subnoise-level Signal recovery in Radar Applications; Allen et. al; Polar Radar for Ice Sheet Measurement (PRISM) Project; ADC 2005

Pulse Inversion Doppler: A new method for Detecting Nonlinear Echoes from Microbubble Contrast agents, Simpson et al; IEEE TRANSACTIONS ON ULTRASONICS, FERROELECTRICS, AND FREQUENCY CONTROL, VOL 46, NO. 2, March 1999.

Introduction to RADAR systems; third edition; Merrill L. Skolnik; 2001

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g. "C") or an object-oriented language (e.g. "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A method for detecting a presence of a remote item from an installation remote from said item, the method comprising:
   a) transmitting an interrogation signal from said installation, said interrogation signal being a signal useful for activating a transponder on a transponder equipped aircraft;
   b) receiving a reflected signal from said remote item, said reflected signal being a signal reflection of said interrogation signal reflected off of said remote item;
   c) determining a distance and bearing of said remote item using said reflected signal;
   wherein said method further comprises passing said reflected signal through a device which creates multiple delayed copies of said reflected signal such that noise in copies of said reflected signal destructively interfere with each other and said copies of said reflected signal constructively add to each other when said multiple copies are added to each other.

2. A method according to claim 1 wherein said remote item is at least one of:
   non-transponder equipped aircraft;
   transponder equipped aircraft which have said transponder disabled;
   land vehicles;
   baggage carts and other equipment;
   luggage.

3. A method according to claim 1 wherein said interrogation signal comprises a train of pulses.

4. A method according to claim 3 wherein said train of pulses comprises a pair of identical pulses, a first of said pair of identical pulses being a phase inverted version of a second of said pair of identical pulses.

5. A method according to 3 wherein said train of pulses comprises a pair of identical pulses, each pulse having a first half and a second half with each second half being a phase inverted version of said first half.

6. A method according to claim 3 wherein said train of pulses comprises pulses whose phase alternates between zero and 180 degrees with reflected 180 degree phase pulses being phase compensated by 180 degrees before being integrated with zero degree phase pulses.

7. A method according to claim 3 wherein said pulse train is used for short range PSR.

8. A method according to claim 3 wherein only a first pulse of said train of pulses is used for short range PSR.

9. A method according to claim 3 wherein said pulse train is used for PSR at ranges up to approximately 50 nautical miles.

10. A method according to claim 3 wherein said pulse train is Zero/$\pi$ modulated on alternative pulses with the reflected $\pi$ pulses being inverted before being added to the zero pulses.

11. A method according to claim 3 wherein said pulse train is modulated with one of individual Barker codes or a combination of Barker codes.

12. A method according to claim 3 wherein a passive device which causes a non-linear response to said interrogating signal is used to mark items of interest.

13. A method according to claim 3 wherein said reflected signal is processed by at least one of Doppler Processing, Moving Target Indication, and Moving Target Detection to distinguish said target from static or slowing moving clutter.

14. A method according to claim 3 wherein TWIPR with harmonic Processing is used to improve target detection.

15. A method according to claim 3 wherein at least one of the following is used to improve target extraction:
Zero/$\pi$ modulation,
TWIPR harmonic processing,
Barker codes, and
phase delay summation.

16. A method according to claim 3 wherein two or more in-band carriers are used as basis of TWIPR, Barker code, and Zero/$\pi$ modulation to cause multiple order intermodulation effects in non-linear targets.

17. A method according to claim 1 wherein said method further comprises a step of:
receiving a response signal from a transponder activated by said interrogation signal.

18. A method according to claim 1 wherein said interrogation signal is a signal useful for at least one of Secondary Surveillance Radar/Identification Friend or Foe (SSR/IFF) and Mode S/Mode 5.

19. A method for detecting at least one target from an installation, the method comprising:
a) transmitting an interrogation signal useful for at least one of Secondary Surveillance Radar/Identification Friend or Foe (SSR/IFF) and Mode S/Mode 5;
b) receiving a response signal from a transponder activated by said interrogation signal, said transponder being on said at least one target;
c) receiving a reflected signal from said at least one target, said reflected signal being a reflection of said interrogation signal off of said at least one target;
d) determining a presence of said at least one target based on at least one of said response signal and said reflected signal;
wherein said method further comprises passing said reflected signal through a device which creates multiple delayed copies of said reflected signal such that noise in copies of said reflected signal destructively interfere with each other and said copies of said reflected signal constructively add to each other when said multiple copies are added to each other.

20. A method according to claim 19 wherein said interrogation signal comprises a pulsed signal at a first frequency.

21. A method according to claim 20 wherein said response signal is a pulsed signal at a second frequency.

22. A method according to claim 21 wherein said response signal is processed with a number of phase offsets at a central frequency which allows phase offsets to be summed to improve said response signal.

23. A method according claim 20 wherein said interrogator signal comprises a pulsed signal containing a number of similar frequencies offset to a central frequency.

* * * * *